United States Patent
Olson et al.

(10) Patent No.: US 8,707,694 B2
(45) Date of Patent: Apr. 29, 2014

(54) SHAPE MEMORY ALLOY ACTUATOR

(75) Inventors: Bret M. Olson, Whitelake, MI (US);
Vijay A. Neelakantan, Rochester Hills, MI (US); Zhe Xie, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 205 days.

(21) Appl. No.: 13/336,901

(22) Filed: Dec. 23, 2011

(65) Prior Publication Data

US 2013/0160445 A1 Jun. 27, 2013

(51) Int. Cl.
*F02G 1/04* (2006.01)
(52) U.S. Cl.
USPC ............................................. 60/527; 60/528
(58) Field of Classification Search
USPC .................. 60/527–529; 137/625.65; 251/11, 251/129.01, 129.06; 475/99, 100; 192/84.1
See application file for complete search history.

(56) References Cited

U.S. PATENT DOCUMENTS

| | | | | |
|---|---|---|---|---|
| 4,422,475 A | * | 12/1983 | Aspinwall | 137/630.15 |
| 4,699,171 A | * | 10/1987 | Sugden | 137/468 |
| 4,973,024 A | * | 11/1990 | Homma | 251/11 |
| H1191 H | * | 6/1993 | Hutchison et al. | 91/459 |
| 5,396,769 A | * | 3/1995 | Brudnicki | 60/528 |
| 6,367,250 B1 | * | 4/2002 | Baumbick | 60/527 |
| 2008/0133090 A1 | * | 6/2008 | Browne et al. | 701/49 |
| 2010/0078173 A1 | * | 4/2010 | Buytaert et al. | 166/302 |
| 2010/0243077 A1 | * | 9/2010 | Grimseth et al. | 137/468 |

* cited by examiner

*Primary Examiner* — Thomas Denion
*Assistant Examiner* — Mickey France

(57) ABSTRACT

A device or actuator includes a first component made of Shape Memory Alloy (SMA) that applies force to a second component of the device to provide a controllable actuator. The SMA component is selectively energized by using active electric current through it.

15 Claims, 4 Drawing Sheets

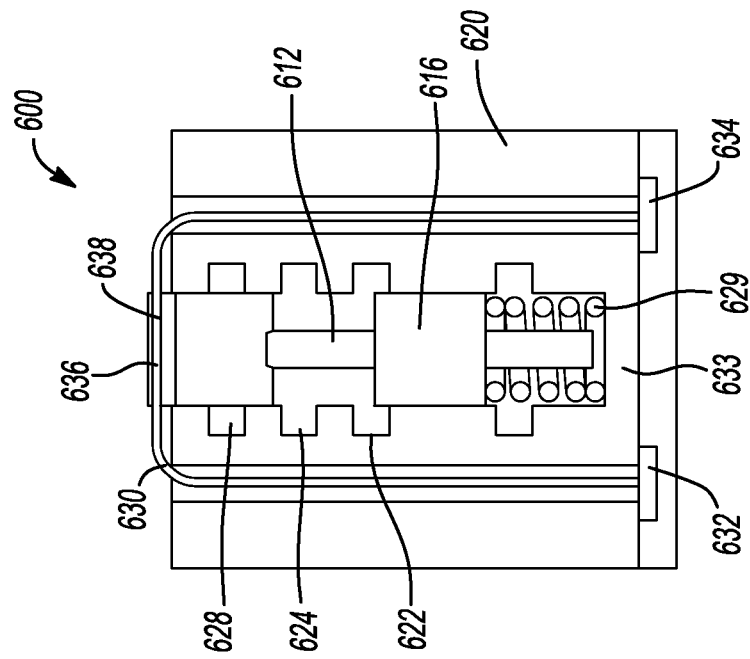
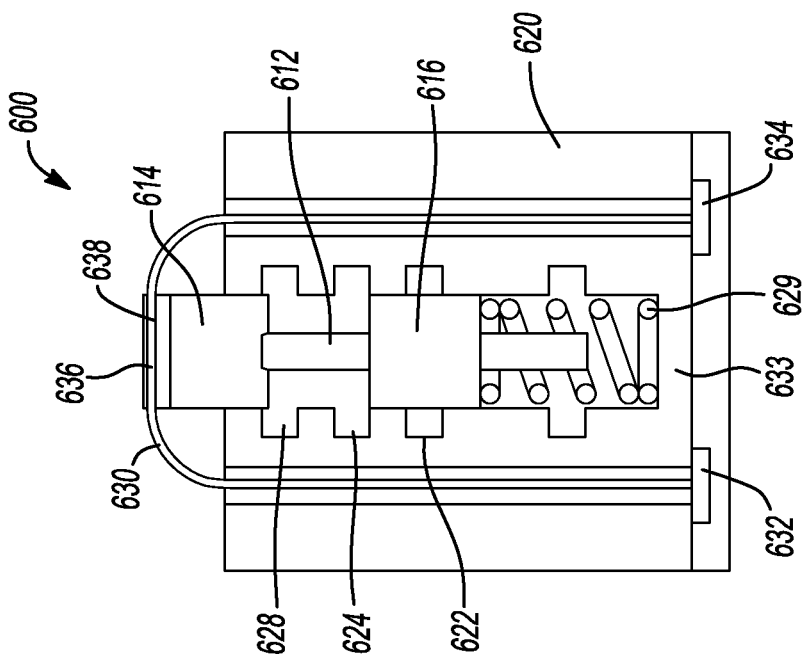

SHAPE MEMORY ALLOY ACTUATOR

FIELD

The present invention relates to actuators. More specifically, the present invention relates to actuators with components made of a shape memory alloy.

BACKGROUND

The statements in this section merely provide background information related to the present disclosure and may or may not constitute prior art.

Typical motor vehicles employ various types of actuators. For example, actuators are employed as hydraulic valves, mechanical piston actuators, clutching mechanisms in the operation of the vehicle's transmission, engine, motorized seats, and any other device or apparatus that requires a physical movement of a component to engage or disengaged the device or apparatus.

Recently, certain actuators employ shape memory alloys to impart an actuation force. Shape memory alloys have the desirable property of becoming rigid when heated above a transition temperature, such that the component formed of the shape memory alloy contracts, thereby imparting the actuation force. To remove the actuation force, however, the shape memory alloy must cool before the alloy can be heated again to engage the actuator.

SUMMARY

A device or actuator includes a first component made of Shape Memory Alloy (SMA) that applies force to a second component of the device to provide a controllable actuator. The SMA component is selectively energized by applying an active electric current through it. The device or actuator itself can be either a hydraulic or mechanical mechanism. More than one SMA component can be employed to provide faster return mechanisms.

The devices using multiple SMA components are either antagonistic or non-antagonistic based on the type of usage of the SMA components. Antagonistic devices use the multiple SMA components to act on the same component of the device in opposite directions and are selectively energized to provide to and fro actuation. The non-antagonistic devices use the multiple SMA components to act on different component in the actuator to still produce the same functional effect of the actuator Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. In the drawings:

FIGS. 7A and 7B are schematic views of yet another hydraulic valve in accordance with the principles of the invention.

DETAILED DESCRIPTION

The following description is merely exemplary in nature and is not intended to limit the present disclosure, application, or uses.

Figure 1:
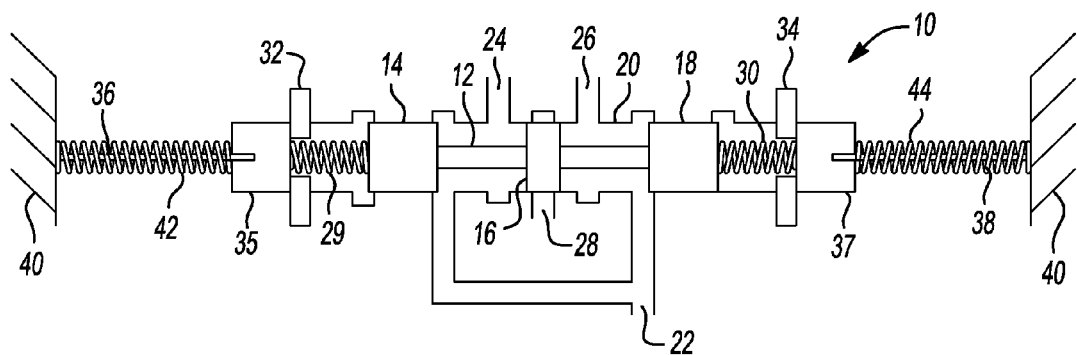
FIG. 1 is schematic view of a hydraulic control valve in accordance with the principles of the present invention.

Referring now to FIG. 1, an antagonistic device, an actuator embodying the principles of the present invention is illustrated therein and designated as 10. The actuator operates as a hydraulic control spool valve 12 with three spool sections 14, 16 and 18 that reciprocates in a bore 20 between two stops 32 and 34. The actuator 10 further includes an inlet port 22, two outlet control ports 24 and 26 and an exhaust port 28. As the valve 12 moves back and forth between the two stops 32 and 34 the spool sections 14, 16, and 18 selectively open and close the inlet port 22 and the control ports 24 and 26 to control the flow of a hydraulic fluid from the inlet port to the outlet ports to actuate a mechanism connected and in communication with the control ports 24 and 26. Positioned between the stop 32 and the spool section 14 is a biasing member 29 attached at one end to the spool section 14 and at the other end to a shuttle 35, and positioned between the stop 34 and the spool section 18 is another biasing member 30 attached at one end to the spool section 18 and at the other end to a shuttle 37. The biasing members 29 and 30 can be coil springs as shown in FIG. 1 or any other suitable component that biases the spool section 14 away from the stop 32 and biases the spool section 18 away from the stop 34, respectively. The shuttle 35 is connected to a wire 36 that is attached to a stationary member 40, such as, for example, a rigid fixture in the transmission housing. And the shuttle 37 is connected to a wire 38 that is attached to the stationary member 40.

Each of the wires 36 and 38 are formed of a shape memory alloy. Shape memory alloys have the desirable property of becoming rigid, that is, returning to a remembered state, when heated above a transition temperature. A shape memory alloy suitable for the wires 36 and 38 is Ni—Ti available under the more commonly known name Nitinol. When this material is heated above the transition temperature, the material undergoes a phase transformation from martensite to austenite, such that the material returns to its remembered state. The transition temperature is dependent on the relative proportions of the alloying elements Ti and Ni (Ni—Ti) and the optional inclusion of alloying additives. Note that any other suitable shape memory alloy may be used for the valve member 25 such as Ag—Cd, Au—Cd, Au—Cu—Zn, Cu—Al, Cu—Al—N, Cu—Zn, Cu—Zn—Al, Cu—Zn—Ga, Cu—Zn—Si, Cu—Zn—Sn, Fe—Pt, Fe—Ni, In—Cd, In—Ti, and Ti—Nb.

As noted above, in this particular implementation, the wires 36 and 38 are made from Nitinol with a desired transition temperature. Thus, when the temperature of the wires 36 and 38 is less than the transition temperature, the wires 36 and 38 are in the martensitic state. And when the temperature of either wire 36 or 38 is heated such that its temperature exceeds the transition temperature, the alloy in the wire 36 or 38 transforms to austenite, such that the wire returns to its remembered state, which in this case is a contracted state.

In some implementations, the wires 36 and 38 may be complemented by biasing members 42 and 44 that extend between the shuttle 35 and the stationary member 40 and between the shuttle 37 and the stationary member 40, respectively. The biasing members 42 and 44 may be made of a shape memory alloy, as well. Alternatively, in some arrangements, the actuator 10 includes only the biasing members 42 and 44 made of shape memory alloy and not the wires 36 and 44.

When the actuator 10 is in use, a current is applied to either the wire 36 or the wire 38 to actuate the hydraulic controller. Specifically, when a current is applied to the wire 36, the wire is heated above the transition temperature so that the shape memory alloy in the wire 36 transforms to austenite causing the wire 36 to contract. This contraction along with the bias force imparted by the biasing member 29 moves the shuttle 35 towards to the left and consequently pulls the valve 12 towards the left as well. The motion of the valve 12 to the left extends the biasing member 30.

When the current is removed from the wire 36 and a current is applied to the wire 38, the shape memory alloy in the wire 36 returns to the martensitic state and the alloy in the wire 38 transforms to austenite. Hence, the wire 36 relaxes while the wire 38 contracts. Accordingly, the shuttle 37 as well as the valve 12 moves to the right compressing the biasing member 30 and extending the member 29. Thus, by applying a desired current to either the wire 36 or 38, the valve 12 and hence the sections 14, 16, and 18 are moved back and forth within the bore 20 to selectively open and close the inlet port 22, the exhaust port 28, and the outlet control ports 24 and 26. Using both the wires 36 and 38 could speed up the to and fro motion of the valve 12. Recall, that in certain implementations, the actuator 10 includes biasing members 42 and 44 in addition to or instead of the wires 36 and 38. These biasing members 42 and 44 can be formed of a shape memory alloy such that a current can be applied selectively to the members to 42 and 44 to actuate the hydraulic control valve in a manner similar to that described above in reference to the wires 36 and 38.

Figure 2:
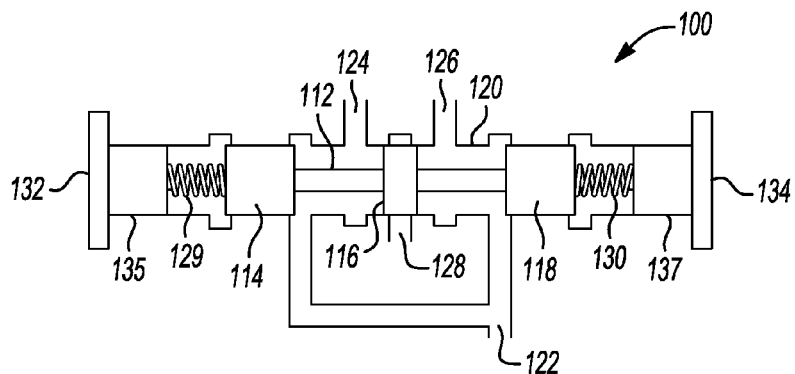
FIG. 2 is a schematic view of yet another hydraulic control valve in accordance with the principles of the present invention.

Referring now to FIG. 2, an antagonistic device, there is shown an actuator 100 arranged as a hydraulic control valve. The actuator 100 includes a valve 112 with three spool sections 114, 116, and 118 that reciprocates in a bore 120 between two ends 132 and 134. The actuator 100 further includes an inlet port 122, two outlet control ports 124 and 126 and an exhaust port 128. As the valve 112 moves back and forth between the two ends 132 and 134 the spool sections 114, 116, and 118 selectively open and close the inlet port 122 and the control ports 124 and 126 to control the flow of a hydraulic fluid from the inlet port to the outlet ports to actuate a mechanism connected and in communication with the control ports 124 and 126. Positioned between the end 132 and the spool section 114 is a stationary member 135 to which one end of a biasing member 129 is attached. The other end of the biasing member 129 is attached to the spool section 114. Similarly, a stationary member 137 is positioned between the end 134 and the spool section 118. One end of a biasing member 130 is attached to the stationary member 137 and the other end is attached to the spool section 118. The biasing members 129 and 130 are formed of a smart member alloy as described above and can be coil springs as shown in FIG. 2 or any other suitable compressible component.

When the actuator 100 is in use, a current is applied to either the biasing member 129 or 130 to actuate the hydraulic control valve. Specifically, when a current is applied to the biasing member 129, the biasing member is heated above the transition temperature so that the shape memory alloy in the biasing member 129 transforms to austenite causing the biasing member 129 to contract. This contraction along with the bias force imparted by the biasing member 130 on the spool section 118 moves the valve 112 towards the left. The motion of the valve 12 to the left extends the biasing member 130.

When the current is removed from the biasing member 129 and a current is applied to the biasing member 130, the shape memory alloy in the biasing member 129 returns to the martensitic state and the alloy in the biasing member 130 transforms to austenite. Hence, the biasing member 129 returns to its relaxed state while the biasing member 130 contracts. Accordingly, the valve 112 moves to the right compressing the biasing member 130 and extending the member 129. Thus, by applying a desired current to either the biasing member 129 or 130, the valve 112 and hence the sections 114, 116, and 118 are moved back and forth within the bore 120 to selectively open and close the inlet port 122, the exhaust port 128, and the outlet control ports 124 and 126.

Figure 3:
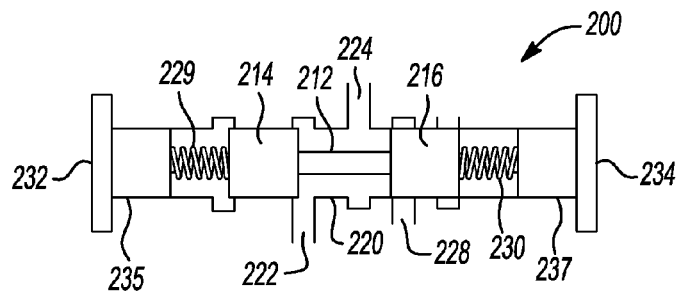
FIG. 3 is a schematic view of a hydraulic valve in accordance with the principles of the present invention.

Turning now to FIG. 3, an antagonistic device, there is shown an actuator configured as a hydraulic valve 200. The valve 200 includes a valve 212 with two spool sections 214 and 216 that reciprocates in a bore 220 between two ends 232 and 234. The valve 200 further includes an inlet port 222, an outlet port 224, and an exhaust port 228. As the valve 212 moves back and forth between the two ends 232 and 234, the spool sections 214 and 216 selectively open and close the inlet port 222 and the outlet port 224 to control the flow of a hydraulic fluid from the inlet port to the outlet port to actuate the valve 200. Positioned between the end 232 and the spool section 214 is a stationary member 235 to which one end of a biasing member 229 is attached. The other end of the biasing member 229 is attached to the spool section 214. Similarly, a stationary member 237 is positioned between the end 234 and the spool section 216. One end of a biasing member 230 is attached to the stationary member 237 and the other end is attached to the spool section 216. The biasing members 229 and 230 are formed of a smart member alloy as described previously and can be coil springs as shown in FIG. 3 or any other suitable component that biases the spool section 214 away from the end 232 and biases the spool section 216 away from the end 234, respectively.

When the valve 200 is in use, a current is applied to either the biasing member 229 or 230 to actuate the valve. Specifically, when a current is applied to the biasing member 229, the biasing member is heated above the transition temperature so that the shape memory alloy in the biasing member 229 transforms to austenite causing the biasing member 229 to contract. This contraction along with the bias force imparted by the biasing member 230 moves the valve 212 towards the left. The motion of the valve 212 to the left extends the biasing member 230.

When the current is removed from the biasing member 229 and a current is applied to the biasing member 230, the shape memory alloy in the biasing member 229 returns to the martensitic state and the alloy in the biasing member 230 transforms to austenite. Hence, the biasing member 229 returns to its relaxed state while the biasing member 230 contracts. Accordingly, the valve 212 moves to the right compressing the biasing member 230 and extending the member 229. Thus, by applying a desired current to either the biasing member 229 or 230, the valve 212 and hence the sections 214 and 216 are moved back and forth within the bore 220 to selectively open and close the inlet port 222, the exhaust port 228, and the outlet port 224.

Figure 4:
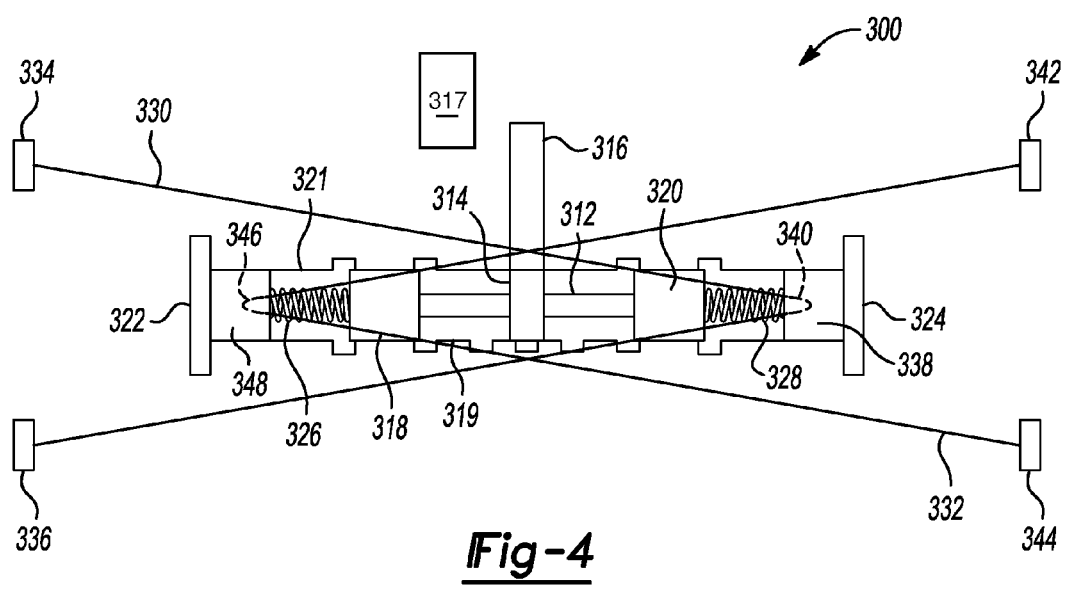
FIG. 4 is a schematic view of a mechanical piston actuator in accordance with the principles of the present invention.

In another implementation shown in FIG. 4, an actuator is arranged as a mechanical piston actuator 300. The piston actuator 300 includes a valve 312 with three spool sections 314, 318, and 320 that reciprocates in a bore 319 between two ends 322 and 324. The piston actuator 300 further includes an arm 316 connected to the spool section 314. The arm 316 is configured to engage, for example, a clutching mechanism 317 to activate and deactivate the clutching mechanism 317 as the valve 312 and hence the arm 316 moves back and forth between the two ends 322 and 324. Positioned between the end 322 and the spool section 318 is a shuttle 348. One end of a biasing member 326 is attached to the shuttle 348 and the other end of the biasing member 326 is attached to the spool section 318. Similarly, a shuttle 338 is positioned between the end 324 and the spool section 320. One end of a biasing member 328 is attached to the shuttle 338 and the other end of the biasing member 328 is attached to the spool section 320. The biasing members 326 and 328 can be coil springs as shown in FIG. 4 or any other suitable compressible component.

The piston actuator 300 further includes a wire 330 and a wire 332, both of which are made of a shape memory alloy as described earlier. One end of the wire 330 is attached to a stationary anchor 334 and the other end of the wire 330 is attached to a stationary anchor 336. A section 340 approximately near the middle of the wire 330 is attached to the shuttle 338, such that any contraction of the wire 330 pulls the shuttle 338 away from the end 324. One end of the wire 332 is attached to a stationary anchor 342 and the other end of the wire 332 is attached to a stationary anchor 344. A section 346 approximately near the middle of the wire 332 is attached to the shuttle 348 such that any contraction of the wire 332 pulls the shuttle 348 away from the end 322.

When the piston actuator 300 is in use, a current is applied to either the wire 330 or 332 to actuate the mechanical piston actuator. Specifically, when a current is applied to the wire 330, the wire is heated above the transition temperature so that the shape memory alloy in the wire 330 transforms to austenite causing the wire 330 to contract. This contraction pulls the shuttle 338 against the biasing member 328, which in turn applies a biasing force on the spool section 320 of the valve 312, thereby moving the section 314 of the valve 312 along with the arm 316 towards the left.

When the current is removed from the wire 330 and a current is applied to the wire 332, the shape memory alloy in the wire 330 returns to the martensitic state and the alloy in the wire 332 transforms to austenite. Hence, the wire 330 returns to its relaxed state while the wire 332 contracts. Accordingly, the wire 332 pulls on the shuttle 348 against the biasing member 326, which in turn applies a biasing force on the spool section 318 of the valve 312, thereby moving the section 314 along with the arm 316 towards the right. Thus, by applying a desired current to either wire 330 or 332, the valve 312 and hence the arm 316 are moved back and forth to selectively engage the arm 316 with the clutching mechanism 317.

Figure 5:
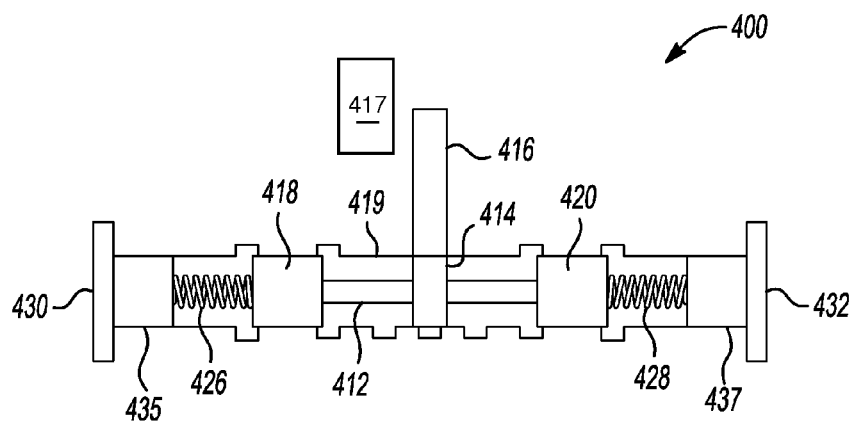
FIG. 5 is a schematic view of yet another mechanical piston actuator in accordance with the principles of the present invention.

In yet another implementation shown in FIG. 5, an actuator is arranged as a mechanical piston actuator 400. The piston actuator 400 includes a valve 412 with three spool sections 414, 418, and 420 that reciprocates in a bore 419 between two ends 430 and 432. The piston actuator 400 further includes an arm 416 connected to the spool section 414. The arm 416 is configured to engage, for example, a clutching mechanism 417 to activate and deactivate the clutching mechanism 417 as the valve 412 and hence the arm 416 move back and forth between the two ends 430 and 432. Positioned between the end 430 and the spool section 418 is a stationary member 435 to which one end of a biasing member 426 is attached. The other end of the biasing member 426 is attached to the spool section 418. Similarly, a stationary member 437 is positioned between the end 432 and the spool section 420. One end of a biasing member 428 is attached to the stationary member 437 and the other end is attached to the spool section 420. The biasing members 426 and 428 are formed of a smart member alloy as described above and can be coil springs as shown in FIG. 5 or any other suitable compressible component.

When the piston actuator 400 is in use, a current is applied to either the biasing member 426 or 428 to actuate the mechanical piston actuator. Specifically, when a current is applied to the biasing member 426, the biasing member is heated above the transition temperature so that the shape memory alloy in the biasing member 426 transforms to austenite causing the biasing member 426 to contract. This contraction along with the bias force imparted by the biasing member 428 on the spool section 420 moves the valve 412 and hence the arm 416 towards the left.

When the current is removed from the biasing member 426 and a current is applied to the biasing member 428, the shape memory alloy in the biasing member 426 returns to the martensitic state and the alloy in the biasing member 428 transforms to austenite. Hence, the biasing member 426 returns to its relaxed state while the biasing member 428 contracts. Accordingly, the valve 412 and hence the arm 416 move to the right. Thus, by applying a desired current to either the biasing member 426 or 428, the arm 416 is moved back and forth so that it selectively engages with the clutching mechanism 417.

Referring now to FIGS. 6A-6D, a non-antagonistic device, there is shown an actuator configured as a hydraulic valve 500. The valve 500 includes a sleeve 514 positioned within a housing 510. The sleeve 514 is arranged to reciprocate within the housing 510. The valve 500 further includes a spool valve 520, with two enlarged sections 524 and 526, which reciprocates within the sleeve 514. The valve 500 is provided with an inlet port 502, an outlet control port 504, and three exhaust ports 505, 506, and 516. As the sleeve 514 moves back and forth within the housing 510 and as the spool valve 520 moves back and forth within the sleeve 514, the inlet port 502, the outlet port 504, and the exhaust ports 505, 506, 516 are selectively opened and closed to control the flow of a hydraulic fluid from the inlet port 502 to the outlet port 504 to actuate the valve 500.

The valve 500 further includes a pair of biasing members 529 and 530. Movement of the sleeve 514 towards the left relative to the sleeve 510 compresses the biasing member 529, and movement of the spool valve 520 towards the right relative to sleeve 514 compresses the biasing member 530. The biasing members 529 and 530 can be coil springs as shown in FIG. 6 or can be any other suitable compressible component.

The valve 500 also includes two wires 508 and 516 formed from a shape memory alloy as described previously. One end of the wire 508 is attached to an anchor 515 and the other end is attached to the sleeve 514. One end of the wire 516 is attached to an anchor 518 and the other end of the wire 516 is attached to the spool valve 520.

Figure 6A:
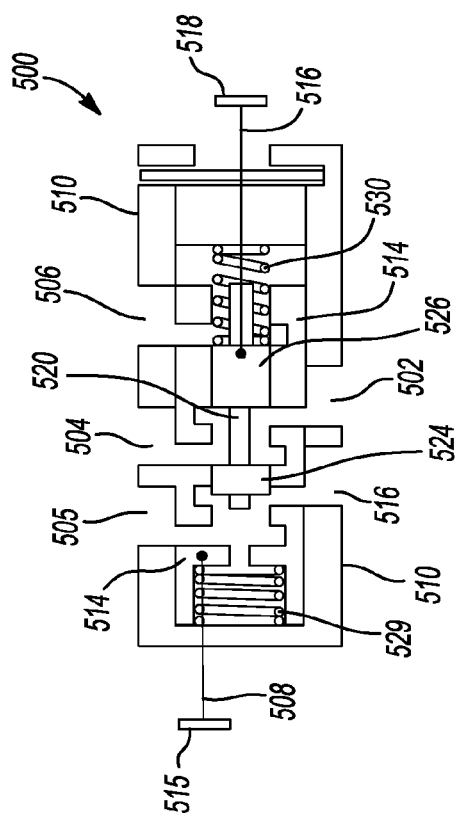
FIGS. 6A-6D are schematic views of another hydraulic valve in accordance with the principles of the invention.
Figure 6B:
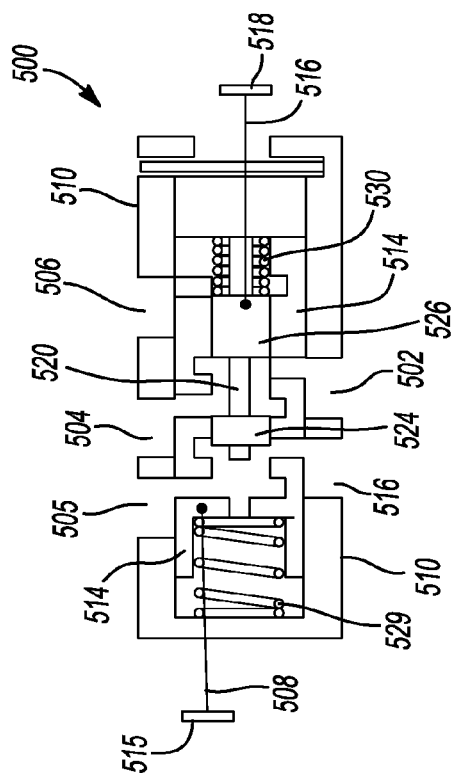

When the valve 500 is in use, a current is applied to either the wire 508 or the wire 516 or to both wires to actuate the valve. Note that when current is not being applied to the wires 508 or 516, the control port 504 exhausts to the exhaust port 506, as shown in FIG. 6A. When a current is applied to the wire 508 the wire is heated above the transition temperature so that the shape memory alloy in the wire 508 transforms to austenite causing the wire 508 to contract. This contraction pulls the sleeve 514 towards the left, which compresses the biasing member 529. Accordingly, as depicted in FIG. 6B, the inlet port 502 opens to the control port 504.

Figure 6C:
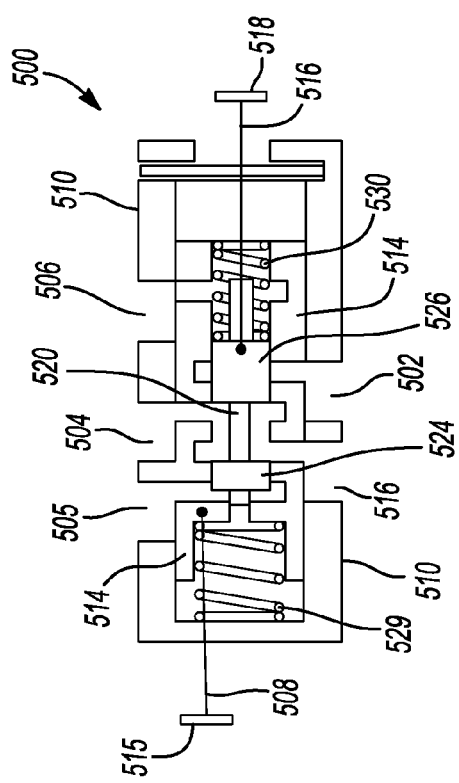

FIG. 6C depicts the valve 500 when a current is applied to the wire 516 in addition to a current being applied to the wire 508. As such, the alloy in the wire 516 transforms to austenite, causing the wire 516 to contract. The contraction of the 516 pulls the spool valve 520 to the right, which compresses the biasing member 530. Hence, when current is applied to both the wire 508 and the wire 516, the control port 504 exhausts to the exhaust ports 505 and 516.

Figure 6D:
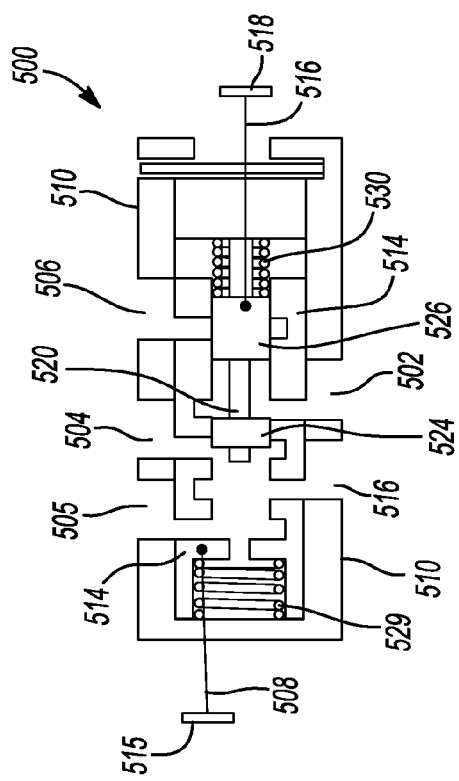

When the current is removed from the wire 508, the shape memory alloy in the wire 508 returns to the martensitic state. Hence, the wire 508 relaxes, and the biasing member 529 imparts a force on the sleeve 514, which moves the sleeve towards the right, as shown in FIG. 6D. When the valve 500 is in this configuration, the control port 504 is again opened to the inlet port 502. Accordingly, by applying a desired current to either the wire 508 or 516, or to both wires, the inlet port 502 and the outlet port 504 are selectively opened and closed to control the flow of a hydraulic fluid through the valve 500 to actuate the valve.

Referring now to FIGS. 7A and 7B, a device with only one SMA component, there is shown another actuator configured as a hydraulic valve 600. The valve 600 includes a spool valve 612 with two spool sections 614 and 616 that reciprocates in a housing 620. The valve 600 further includes an inlet port 622, an outlet control port 624, and an exhaust port 628. As the spool valve 612 moves back and forth between ends 633 and 638, the spool sections 614 and 616 selectively open and close the inlet port 622 and the outlet port 624 to control the flow of a hydraulic fluid from the inlet port to the outlet port to actuate the valve 600. Positioned between the end 633 of the housing 620 and the spool section 616 is a biasing member 629. Although the biasing member 629 is shown as a coiled spring in FIGS. 7A and 7B, the biasing member 629 any other suitable component that biases the spool section 616 away from the end 633.

The valve 600 also includes a wire 630 made of a shape member alloy as described earlier. One end of the wire 630 is attached to a stationary anchor 632 and the other end of the wire 630 is attached to a stationary anchor 634. A section 636 approximately near the middle of the wire 630 is attached to the end 638 of the enlarged spool 614 such that any contraction of the wire 630 pulls the spool valve 612 towards the end 633 of the housing 620, thereby compressing the biasing member 629.

When the valve 600 is in use, a current is applied to the wire 630 to actuate the valve. Hence, the wire 630 is heated above the transition temperature so that the shape memory alloy in the wire 630 transforms to austenite causing the wire 630 to contract. This contraction pulls the spool valve 612 towards the end 633 of the housing 620 such that the control port 624 opens to the inlet port 622, as shown in FIG. 6B.

When the current is removed from the wire 630 the wire 630 returns to the martensitic state. Hence, the wire 630 returns to its relaxed state, and the biasing member 629 pushes the spool valve 612 away from the end 633 of the housing 620. Accordingly, when the current to the wire 630 is turned off, the control port 624 exhausts to the exhaust port 628 as shown in FIG. 7B. Thus, by selectively applying a desired current to the wire 630, the spool valve 612 moves up and down within the housing 620 to selectively open and close the inlet port 622 and the outlet control port 624.

A particular feature of the actuators described with reference to FIGS. 1 through 7 is an increased actuation frequency achieved by employing opposing components made of shape memory alloy. Specifically, each of the actuators described above includes a shape memory alloy wire and/or a biasing member that engages the valve or piston actuator by imparting a force on a component in the valve or piston actuator in one direction and may include another shape memory alloy component that disengages the valve or piston actuator by imparting a force on the component in an opposing direction. Hence, each actuator can be quickly engaged or disengaged by selectively applying a current to each of the two opposing shape memory alloy members. The actuators may include a single shape memory alloy component. Alternatively, the actuators may include multiple shape memory alloy components. The actuators with multiple shape memory alloy components can be antagonistic; that is, the shape memory alloy components work against each other as they each impart a force on a particular moving component in the actuator. In some arrangements, the multiple shape memory alloy components are non-antagonistic; that is, the shape memory alloy components may act independently on different moving components of the actuator.

The description of the invention is merely exemplary in nature and variations that do not depart from the gist of the invention are intended to be within the scope of the invention. Such variations are not to be regarded as a departure from the spirit and scope of the invention.

What is claimed is:

1. An actuator comprising:
a first component made of a shape memory alloy (SMA), the first component applying a force to a second component of the actuator, the actuator being a mechanical piston actuator; and
a third component made of the SMA, the third component applying an opposing force to the second component; and
a valve that reciprocates within a bore, the valve having a plurality of spool sections, one of which is attached to an arm configured to engage a clutching mechanism, the arm selectively engaging and disengaging the clutching mechanism as the force imparted by the first component and the opposing force imparted by the third component selectively move the valve back and forth within the bore,
wherein the force imparted by the first component is in the opposite direction of the opposing force imparted by the third component and wherein selective application of the force imparted by the first component and the opposing force imparted by the third component selectively activates and de-activates the actuator.

2. The actuator of claim 1 wherein the first component and the third component are wires.

3. The actuator of claim 1 wherein the first component and the third component are biasing members.

4. The actuator of claim 3 wherein the biasing members are coiled springs.

5. The actuator of claim 1 wherein each of the first component and the third component is a wire combined with a biasing member.

6. The actuator of claim 5 wherein the biasing members are coiled springs.

7. The actuator of claim 1 wherein the SMA is Ni—Ti.

8. The actuator of claim 1 wherein the actuator is a hydraulic control valve.

9. The actuator of claim 8 wherein the hydraulic control valve includes an inlet port and a pair of outlet ports.

10. The actuator of claim 9 wherein the second component is a valve that reciprocates in a bore, the valve having a plurality of spool sections which selectively open and close the ports to control the flow of a hydraulic fluid through the actuator as the force imparted by the first component and the opposing force imparted by the third component selectively move the valve back and forth within the bore.

11. The actuator of claim 8 wherein the first component and the third component are biasing members.

12. The actuator of claim 11 wherein the biasing members are coil springs.

13. The actuator of claim 1 wherein the actuator is a hydraulic valve with an inlet port and an outlet port, the actuator further comprising a valve with a plurality of spool sections that reciprocate within a bore, the valve being selectively activated and de-activated as the spool sections selectively open and close the input port and the outlet port to control the flow of a hydraulic fluid through the valve as the force imparted by the first component and the opposing force imparted by the third component selectively move the valve back and forth within the bore.

14. The actuator of claim 1 wherein the first component and the third component are wires.

15. The actuator of claim 1 wherein the first component and the third component are biasing members.

* * * * *